United States Patent
Sawada

(10) Patent No.: US 9,971,939 B2
(45) Date of Patent: May 15, 2018

(54) IMAGE PROCESSING APPARATUS, DISPLAY STATE DETERMINATION APPARATUS, AND IMAGE PROCESSING METHOD

(71) Applicant: TOSHIBA TEC KABUSHIKI KAISHA, Tokyo (JP)

(72) Inventor: Takayuki Sawada, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 268 days.

(21) Appl. No.: 14/870,704

(22) Filed: Sep. 30, 2015

(65) Prior Publication Data
US 2016/0379052 A1 Dec. 29, 2016

(30) Foreign Application Priority Data
Jun. 23, 2015 (JP) .................. 2015-125587

(51) Int. Cl.
G06K 9/00 (2006.01)
H04N 5/232 (2006.01)
H04N 5/247 (2006.01)
G06K 9/46 (2006.01)

(52) U.S. Cl.
CPC ....... *G06K 9/00624* (2013.01); *G06K 9/4671* (2013.01); *H04N 5/23229* (2013.01); *H04N 5/247* (2013.01)

(58) Field of Classification Search
CPC .. G06K 9/624; G06K 9/261; G08B 13/19608; H04N 13/026; H04N 17/002; G06Q 30/06
See application file for complete search history.

(56) References Cited

U.S. PATENT DOCUMENTS

| 2005/0052533 A1* | 3/2005 | Ito | G08B 13/19608 348/169 |
| 2012/0075291 A1* | 3/2012 | Sohn | H04N 13/026 345/419 |
| 2015/0365660 A1* | 12/2015 | Wu | G06T 7/74 348/158 |
| 2017/0017840 A1* | 1/2017 | Higa | G06Q 30/06 |

FOREIGN PATENT DOCUMENTS

| JP | 2013-109773 | 6/2013 |
| WO | 2008-100248 | 8/2008 |

* cited by examiner

*Primary Examiner* — Sathyanaraya V Perungavoor
*Assistant Examiner* — Patricia I Young
(74) *Attorney, Agent, or Firm* — Patterson & Sheridan, LLP

(57) ABSTRACT

In accordance with one embodiment, an image processing apparatus which is accessible to at least one storage device, the apparatus includes a decision unit, a generation unit and a determination unit. The decision unit estimates a separation distance from the first camera to the display shelf. The decision unit decides a search distance, based on the separation distance. The generation unit generates a template image by converting a number of pixels of single item image acquired by photographing the product as a single piece and stored in the storage device, with a magnification corresponding to a ratio between the search distance and a known photographing distance. The determination unit determines an area, which is similar to the template image, within a shelf image stored in the storage device.

7 Claims, 9 Drawing Sheets

| No. | Product name | Image file name | Photographing distance information |
|---|---|---|---|
| 1 | Product A | item_A.tif | 0.5m |
| 2 | Product B | item_B.tif | 0.3m |
| 3 | Product C | item_C.tif | 0.8m |
| 4 | Product D | item_D.tif | 3m |
|   |   |   |   |
|   |   |   |   |
F I G. 2
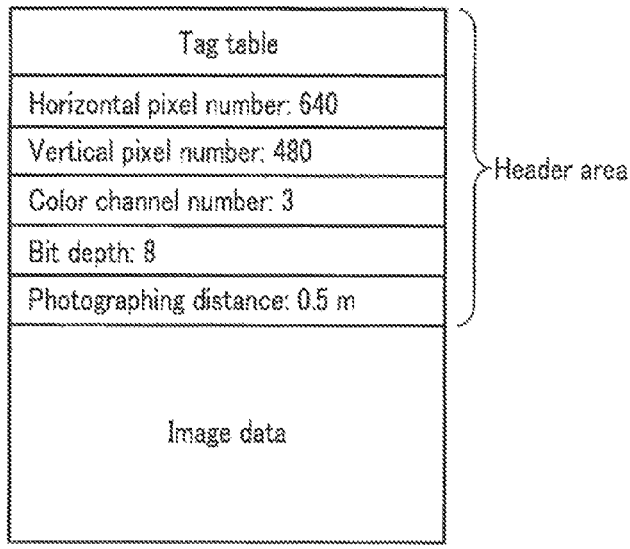
F I G. 3
| No. | Product name | Shelf number | In-shelf position |
|---|---|---|---|
| 1 | Product A | 1 | Upper shelf |
| 2 | Product B | 2 | Upper shelf |
| 3 | Product C | 1 | Lower shelf |
| 4 | Product D | 2 | Lower shelf |
|   |   |   |   |
|   |   |   |   |
F I G. 4

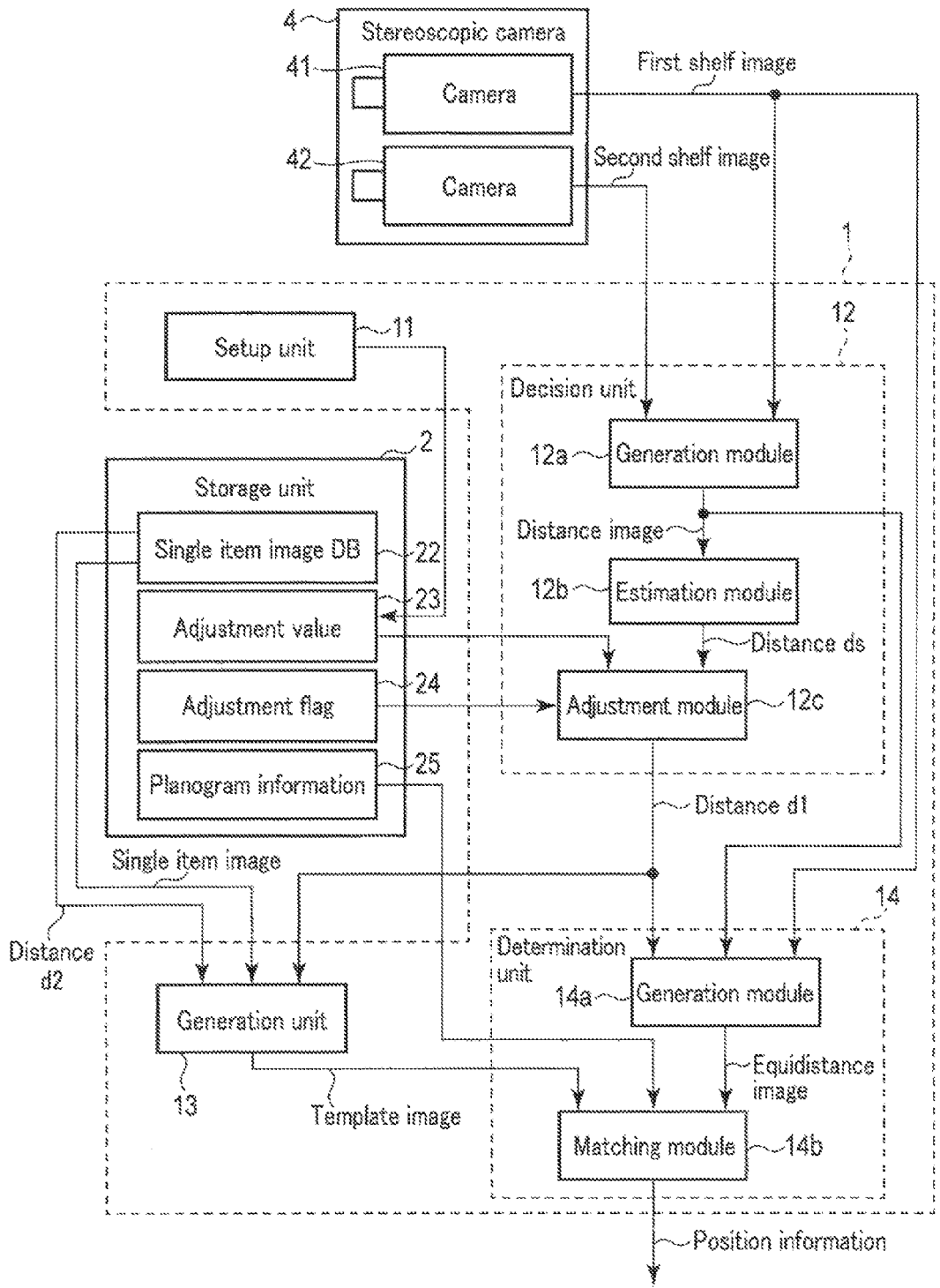
F I G. 5

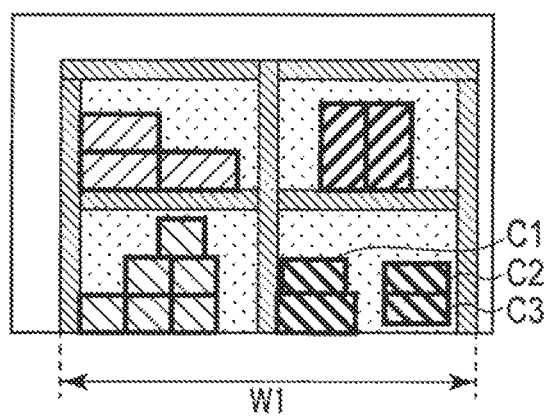
F I G. 7
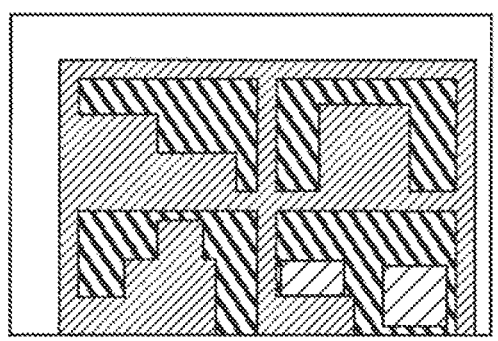
F I G. 8

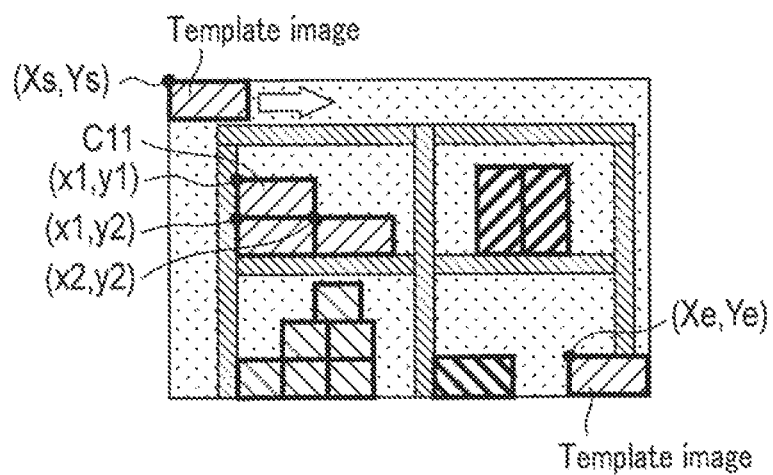
F I G. 14

IMAGE PROCESSING APPARATUS, DISPLAY STATE DETERMINATION APPARATUS, AND IMAGE PROCESSING METHOD

CROSS-REFERENCE TO RELATED APPLICATION

This application is based upon and claims the benefit of priority from Japanese Patent Application No. 2015-125587, filed Jun. 23, 2015, the entire contents of which are incorporated herein by reference.

FIELD

Embodiments described herein relate generally to an image processing apparatus, a display state determination apparatus, and an image processing method.

BACKGROUND

There is known an image monitoring system for enabling, by images captured by a camera, monitoring of a display state of products in a display shelf in a store.

However, in general, in this kind of system, store staff visually checks stockout, etc. of products.

Although there is known a system which recognizes products appearing in an image by an image process, this system is not suited to monitor the display state of products in a display shelf.

Under the circumstances, it is desired to efficiently acquire information for confirming the display state of products in the display shelf, from an image captured by photographing the display shelf.

BRIEF DESCRIPTION OF THE SEVERAL VIEWS OF THE DRAWINGS

FIG. 2 is a view which schematically illustrates an example of description content of a management table in FIG. 1.

FIG. 3 is a view illustrating a configuration example of an image file including information of a photographing distance.

FIG. 4 is a view which schematically illustrates an example of planogram information in FIG. 1.

FIG. 5 is a block diagram of functions of a processor in FIG. 1, which are realized by executing an image processing program in FIG. 1.

FIG. 7 is a view illustrating an example of a first shelf image.

FIG. 8 is a view illustrating an example of a distance image generated in connection with the first shelf image shown in FIG. 7.

FIG. 14 is a view illustrating starting coordinates (Xs, Ys) and end coordinates (Xe, Ye).

DETAILED DESCRIPTION OF THE INVENTION

In accordance with one embodiment, an image processing apparatus which is accessible to at least one storage device storing a shelf image acquired by photographing, by a first camera, a display shelf for displaying a product, and a single item image acquired by photographing the product as a single piece with a known photographing distance, the apparatus includes a decision unit, a generation unit and a determination unit. The decision unit configured to estimate a separation distance from the first camera to the display shelf, and to decide a search distance, based on the separation distance. The generation unit configured to generate a template image by converting a number of pixels of the single item image stored in the storage device, with a magnification corresponding to a ratio between the search distance decided by the decision unit and the known photographing distance. The determination unit configured to determine an area, which is similar to the template image, within the shelf image captured by the first camera and stored in the storage device.

Hereinafter, an example of an embodiment will be described with reference to the accompanying drawings.

Figure 1:
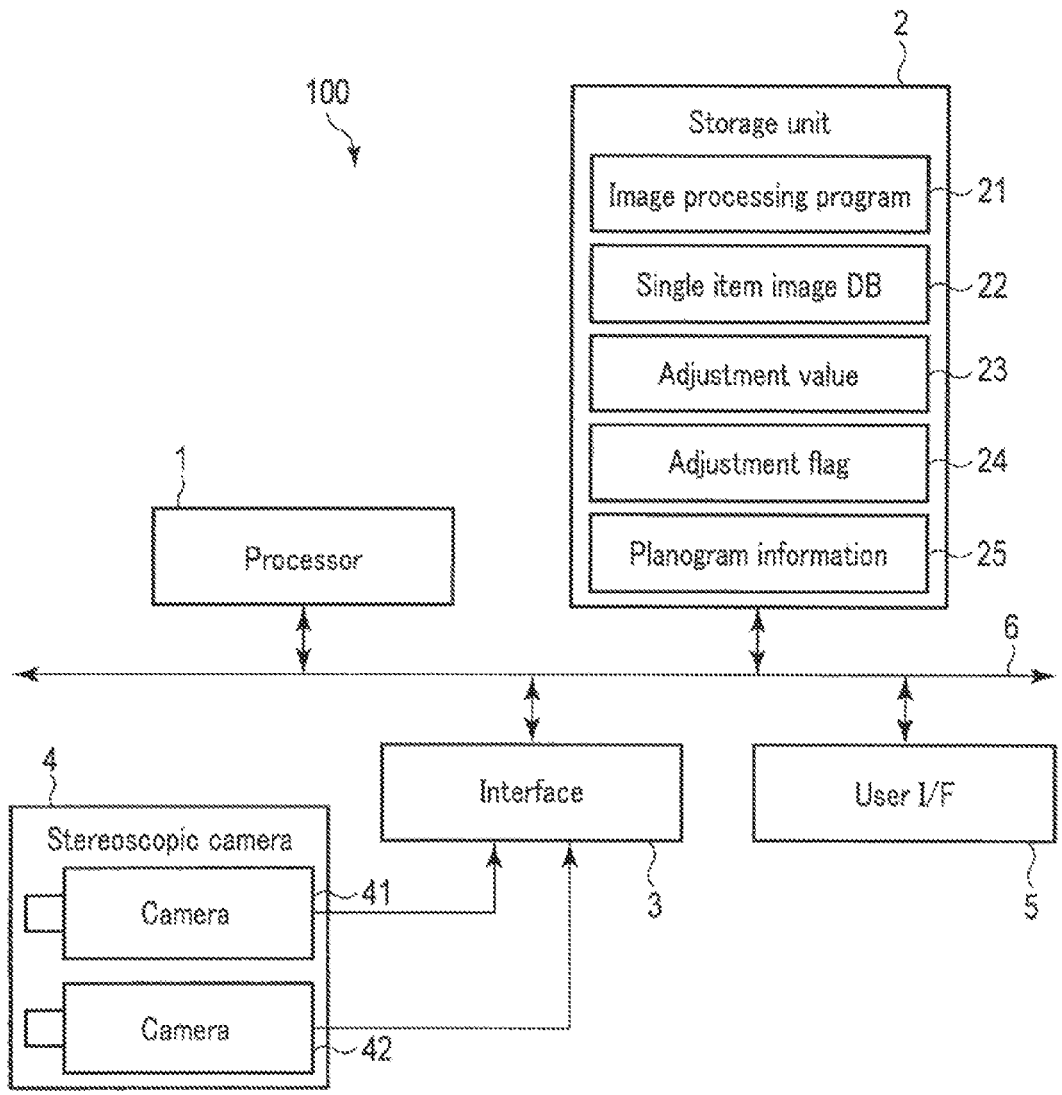
FIG. 1 is a block diagram of a main circuit configuration of a display state determination apparatus according to an embodiment.

FIG. 1 is a block diagram of a main circuit configuration of a display state determination apparatus 100 according to the embodiment.

The display state determination apparatus 100 includes a processor 1, a storage unit 2, an interface (communication/input/output I/F) 3, a stereoscopic camera 4, a user interface (user I/F) 5, and a bus 6. The processor 1, on one hand, and the storage unit 2, interface 3 and user interface 5, on the other hand, are connected by the bus 6. The bus 6 includes an address bus, a data bus, and a control signal line. The processor 1 and storage unit 2, by being connected by the bus 6, constitute a computer.

The processor 1 corresponds to a central part of the computer. The processor 1 controls the respective components of the display state determination apparatus 100 in accordance with an operating system and application programs stored in the storage unit 2, thereby to realize various functions as the display state determination apparatus 100.

The storage unit 2 corresponds to a main storage part of the computer. The storage unit 2 includes a nonvolatile memory area and a volatile memory area. The nonvolatile memory area of the storage unit 2 stores the operating system and application programs. In some cases, the storage unit 2 stores, in the nonvolatile or volatile area, necessary data for the processor 1 to execute the process for controlling the respective components. The volatile memory area functions also as a work area in which data is rewritten by the processor 1, when necessary.

The storage unit 2 may include an auxiliary storage device which corresponds to an auxiliary storage part of the computer. The auxiliary storage device is, for instance, an electrically erasable programmable read-only memory (EEPROM), a hard disk drive (HDD) or a solid state drive (SSD). The auxiliary storage device stores data which the processor 1 uses in executing various processes, and data which was generated by the processing of the processor 1. In some cases, the auxiliary storage device stores application programs.

The interface 3 is an interface of data communication over a network, and data communication between various input/output devices. As the interface 3, for example, use can be made of a well-known device for executing data communication over the Internet, and a well-known device which supports a well-known interface standard such as universal serial bus (USB).

The stereoscopic camera 4 is connected to the interface 3. The stereoscopic camera 4 includes two cameras 41 and 42. The cameras 41 and 42 are disposed spaced apart, so as to be able to photograph an identical object in different directions. The cameras 41 and 42 synchronously execute photography. The cameras 41 and 42 respectively output an image data, which represent captured images, to the interface 3. In the present embodiment, the camera 41 is used as a first camera.

The user interface 5 includes an input device and an output device. The user interface 5 inputs information, based on a user operation on the input device. The user interface 5 presents information to the user by the output device. The input device corresponds to, for example, a keyboard, a touch sensor, or a pointing device. The output device corresponds to, for example, a display or a printer. Each of the input device and output device may include a plurality of kinds of devices.

The processor 1, storage unit 2, interface 3, stereoscopic camera 4 and user interface 5 are mounted on, for example, a single dolly, and constitute the display state determination apparatus 100 as an integral unit. Then, the display state determination apparatus 100 moves within a store such as a supermarket, while photographing display shelves, on which goods are displayed, by the stereoscopic camera 4. It is assumed that the display state determination apparatus 100 is moved by human power, but the display state determination apparatus 100 may be moved by driving force that a power source such as a motor generates. Accordingly, two image data, each of which the stereoscopic camera 4 outputs, represent shelf images captured by photographing the display shelf.

The processor 1, storage unit 2, interface 3 and user interface 5, on the one hand, and the stereoscopic camera 4, on the other hand, may constitute two separate units, and these units may cooperate to form the display state determination apparatus 100. In this case, the two units are interconnected via a wired or wireless communication line or communication network. The two units may directly transmit/receive image data via the communication line or communication network, or may indirectly transmit/receive image data via, for example, a server apparatus. When the respective components are separated into the two units, such a mode is assumed that, for example, one of the two units is formed as a movable unit configured such that the stereoscopic camera 4 is mounted on the dolly, and the other unit is formed as an image processing apparatus that is fixedly disposed.

The application programs, which the storage unit 2 stores, include an image processing program 21. The image processing program 21 is a computer program for causing the processor 1 to function as respective units to be described later. Typically, this image processing program 21 is written in the storage unit 2 before the display state determination apparatus 100 is transferred to the user. However, after the display state determination apparatus 100 in a state in which the image processing program 21 is not written in the storage unit 2 is transferred to the user, the image processing program 21 may be written in the storage unit 2 in accordance with an operation by the user.

A part of the storage area of the storage unit 2 is used as a single item image database (single item image DB) 22. The storage unit 2 stores an adjustment value 23, an adjustment flag 24, and planogram information 25.

The single item image database 22 stores a plurality of image files and one management table.

Each of the image files includes image data representative of an image (hereinafter referred to as "single item image") which was acquired by photographing a product as a single piece that is a target of shelf state confirmation. It is desirable to use the camera 41 in order to capture the single item image. Alternatively, the camera 42 may be used in order to capture the single item image, or a camera, which is different from the cameras 41 and 42, may be used. However, it is preferable that the optical magnification and characteristics of imaging elements of the camera, which is used for capturing the single item image, are as close as possible to the optical magnification and characteristics of imaging elements of the camera 41.

The management table is a set of data records relating to the respective image files.

FIG. 2 is a view which schematically illustrates an example of description content of the management table.

The data record, which the management table includes, includes fields of a number, a product name, an image file name, and photographing distance information. In the field of the number, a number, which is allocated in a manner not to overlap other data records, is described. In the field of the product name, the name of an associated product is described. In the field of the image file name, a file name for identifying associated image data is described. In the field of the photographing distance information, a separation distance from the product to the camera at the time of capturing the single item image is described. Accordingly, the photographing distance of the single item image is known based on the information described in this field.

In the meantime, by including the information of the photographing distance in the image file, the field of the photographing distance information may be omitted from the management table. In addition, the photographing distance information may be omitted by stipulating, as a rule, that the photographing distance of the single item image is set to be a preset fixed distance.

FIG. 3 is a view illustrating a configuration example of the image file including the photographing distance information.

In the example of FIG. 3, the photographing distance information is described in a header area.

The adjustment value 23 is a numerical value which the user designates in order to adjust a target position of display state confirmation.

The adjustment flag 24 indicates whether or not to execute adjustment using the adjustment value 23. The adjustment flag 24 is turned on/off by the processor 1 in accordance with an instruction of the user.

The planogram information 25 is a set of data records indicating which product is displayed at which position of which display shelf.

FIG. 4 is a view which schematically illustrates an example of the planogram information 25.

The data record, which the planogram information 25 includes, includes fields of a number, a product name, a shelf number, and an in-shelf position. In the field of the number, a number, which is allocated in a manner not to overlap other data records, is described. In the field of the product name, the name of an associated product is described. In the field of the shelf number, a number for identifying a display shelf, on which an associated product is displayed, is described. In the field of the in-shelf position, a display position of an associated product in the display shelf is described.

FIG. 5 is a block diagram of functions of the processor 1, which are realized by executing the image processing program 21.

The processor 1 executes processes based on the image processing program 21, as will be described later, thereby functioning as a setup unit 11, a decision unit 12 and a generation unit 13.

The setup unit 11 sets up the adjustment value in accordance with an instruction by the user on the user interface 5. The setup unit 11 writes the set adjustment value in the storage unit 2.

The decision unit 12 estimates a photographing distance by the camera 41 to a product that is a detection target, based on first and second shelf images represented by first and second image data which the cameras 41 and 42 output.

The function as the decision unit 12 further includes functions as a generation module 12a, an estimation module 12b and an adjustment module 12c.

The generation module 12a estimates, with respect to each of pixels constituting the first shelf image, a photographing distance by the camera 41 of the object which the pixel represents. The generation module 12a generates a distance image in which the respective pixels of the first shelf image are replaced with pixel values corresponding to the photographing distances estimated with respect to the pixels.

The estimation module 12b estimates a separation distance ds to the front surface of the display shelf appearing on the first shelf image, as a distance corresponding to substantially equal pixel values which are consecutive in the horizontal direction over a prescribed number or more in the distance image.

When the adjustment flag stored in the storage unit 2 is in the ON state, the adjustment module 12c adjusts the separation distance ds by using the adjustment value 23 stored in the storage unit 2, and acquires a search distance d1. When the adjustment flag stored in the storage unit 2 is in the OFF state, the adjustment module 12c adopts the separation distance ds as the search distance d1 as such. Then, the adjustment module 12c outputs the search distance d1.

The generation unit 13 generates a template image by converting the number of pixels of a single item image stored in the storage unit 2, with a magnification corresponding to the ratio between the search distance d1 and a photographing distance d2 of the single item image.

The determination unit 14 determines an area within the first shelf image, which is similar to the template image.

The function as the determination unit 14 further includes functions as a generation module 14a and a matching module 14b.

The generation module 14a generates an equidistance image which indicates a pixel value in the first shelf image with respect to a pixel of the first shelf image, which has the photographing distance by the camera 41 that is equal to the photographing distance d1, and indicates a preset pixel value with respect to the other pixels of the first shelf image.

The matching module 14b determines an area within the equidistance image, which is similar to the template image.

In the meantime, in the processes by the above-described various functions, the processor 1 stores in the storage unit 2 the data and various numerical values representing the various images.

Next, the operation of the display state determination apparatus 100 with the above-described configuration is described.

The processor 1 executes the image process in accordance with the image processing program 21. Incidentally, the content of the process to be described below is merely an example, and various processes, by which the same result can be obtained, may be utilized as needed.

While moving the display state determination apparatus 100 in the store, the user photographs, by the stereoscopic camera 4, display shelves whose display state is to be confirmed. The processor 1 stores in the storage unit 2 first and second shelf image data obtained by the cameras 41 and 42 with the stereoscopic camera 4, such that simultaneously acquired first and second shelf image data are stored as a set. Incidentally, although the timing of photographing by the stereoscopic camera 4 may be arbitrarily set, the timing of photographing is, typically, each time the user inputs the instruction for photography through the user interface 5. However, for example, when a mark such as a bar code, which is formed on the display shelf, entered the view field of the camera 41, the stereoscopic camera 4 may automatically execute photography. The storage unit 2 may store the shelf number of the display shelf that is the target of photography, by associating the shelf number with the first and second shelf image data. For example, the user may designate the shelf number, or the processor 1 may determine the shelf number from, for example, the above-mentioned bar code.

Figure 6:
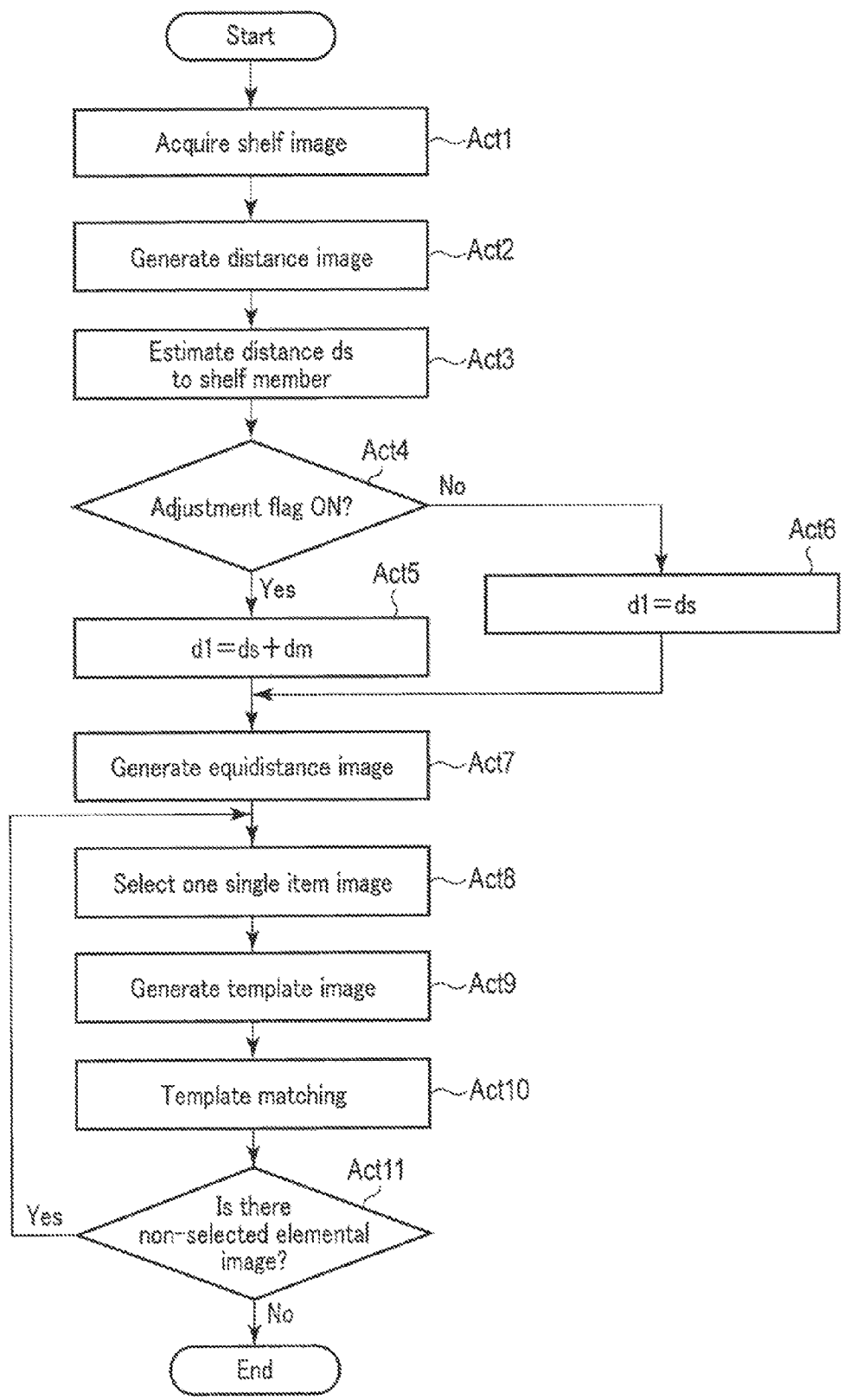
FIG. 6 is a flowchart of an image process by the processor in FIG. 1.

FIG. 6 is a flowchart of the image process by the processor 1.

Based on the image process program 21, the processor 1 executes the process illustrated in FIG. 6, in parallel with the photographing of the display shelf, as described above, or at an arbitrary timing after the end of the photographing.

In Act 1, the processor 1 acquires from the storage unit 2 one set of first and second shelf images which were stored as described above.

In Act 2, the processor 1 generates a distance image, based on the first and second shelf images.

FIG. 7 is a view illustrating an example of the first shelf image.

In FIG. 7, areas of subjects of the same kind are expressed by the same hatching. Specifically, the members of the display shelf are expressed by the same hatching. In addition, products of the same kind are expressed by the same hatching.

The first and second shelf images are substantially the same image, since the first and second shelf images were captured by simultaneously photographing the same display shelf. However, since the cameras 41 and 42 are spaced apart, a slight difference corresponding to parallax occurs between the first and second shelf images. By a well-known process utilizing parallax, the processor 1 estimates the photographing distance of the subject by the first camera with respect to each of the pixels of the first shelf image. Then, the processor 1 generates a distance image by replacing the pixel value of each pixel of the first shelf image with a pixel value corresponding to the photographing distance estimated with respect to the pixel.

Thus, by the processor 1 executing the process based on the image processing program 21, the computer including the processor 1 as the central unit functions as the generation module 12a.

FIG. 8 is a view illustrating an example of the distance image generated in connection with the first shelf image shown in FIG. 7.

In FIG. 8, substantially equal pixel values are expressed by the same hatching.

In Act 3, the processor 1 estimates a separation distance ds to the shelf members which constitute the display shelf appearing on the first shelf image.

In general, a display shelf includes a horizontal top plate and a horizontal shelf plate as a part of shelf members. Each of the top plate and shelf plate has a greater width than a displayed product in the horizontal direction. In the example of FIG. 7, the top plate and shelf plate extend over a width w1 in the horizontal direction. In addition, the separation distance from the camera 41 to various positions in the horizontal direction of the top plate and shelf plate varies successively. By making use of this characteristic, the processor 1 estimates the separation distance ds.

Thus, by the processor 1 executing the process based on the image processing program 21, the computer including the processor 1 as the central unit functions as the estimation module 12b.

Figure 9:
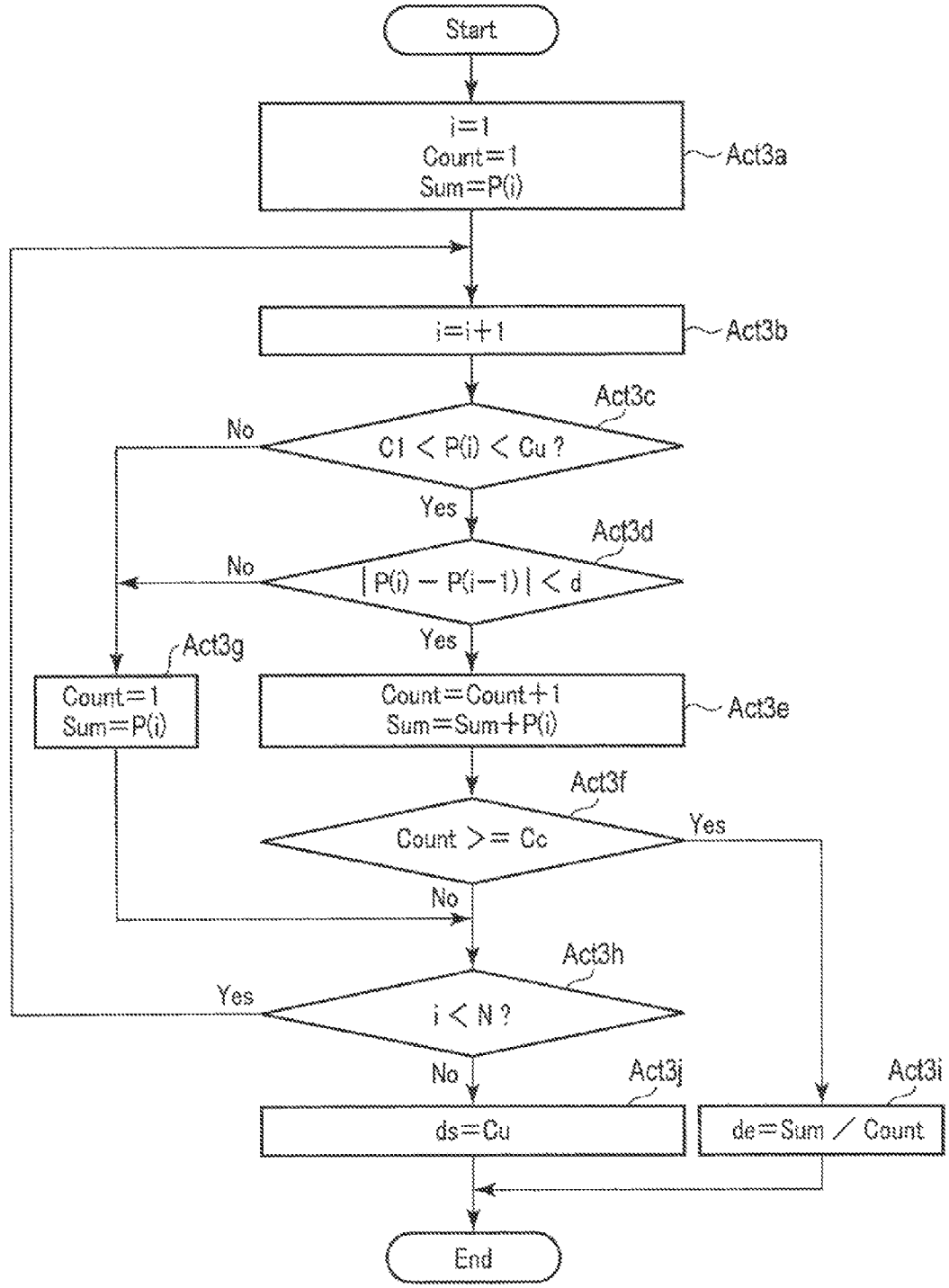
FIG. 9 is a flowchart illustrating a detailed process of the processor in FIG. 1, which relates to estimation of a separation distance in FIG. 6.

FIG. 9 is a flowchart illustrating a detailed process of the processor 1 in Act 3.

In Act 3a, the processor 1 substitutes "1" for each of a variable i and a variable Count, and substitutes a pixel value P(i) for a variable Sum. The variable i represents a pixel number for identifying each pixel in the distance image. The variable Count represents a count value of a consecutive number. The variable Sum represents a cumulative sum of pixel values. The pixel value P(i) represents a pixel value of a pixel with a pixel number "i".

In Act 3b, the processor 1 increments the value of variable i by 1. As will be described later, the processor 1 repeatedly executes Act 3b. Specifically, the processor 1 successively changes a pixel of interest.

In Act 3c, the processor 1 confirms whether the pixel value P(i) is greater than a minimum value Cl and is less than a upper value Cu. Here, the lower value Cl and upper value Cu represent a lower value and an upper value of the range of numerical values which the pixel value of the pixel corresponding to the shelf member in the distance image can take. The lower value Cl and upper value Cu are properly preset by, for example, the designer of the display state determination apparatus 100 or the creator of the image processing program 21. For example, the tolerable range of the separation distance between the stereoscopic camera 4 and the display shelf at the time of photographing the display shelf by the stereoscopic camera 4 is set as a rule in the use of the display state determination apparatus 100. Then, for example, it is assumed that the lower value Cl is set as a value which is calculated by subtracting a margin from the pixel value corresponding to the lower limit value of the tolerable range, and the upper value Cu is set as a value which is calculated by adding a margin to the pixel value corresponding to the upper limit value. Specifically, the processor 1 confirms whether the pixel value of the pixel of interest is a value corresponding to a distance which is possible as a separation distance between the stereoscopic camera 4 and the display shelf. Then, if the processor 1 determines "Yes" in Act 3c, the processor 1 goes to Act 3d.

In Act 3d, the processor 1 confirms whether the absolute value of a value, which is calculated by subtracting a pixel value P(i−1) from the pixel value P(i), is less than a tolerable difference value d. Here, the tolerable difference value d represents a value which is tolerable as a difference between pixel values of two pixels neighboring in the horizontal direction in the distance image, when each of the two pixels corresponds to the horizontal shelf member. The tolerable difference value d is properly preset by, for example, the designer of the display state determination apparatus 100 or the creator of the image processing program 21. For example, as described above, the separation distance from the camera 41 to various positions in the horizontal shelf member varies successively. It is assumed that the tolerable difference value d is set as a value which is close to the upper value of the difference of pixel values of neighboring pixels, which may occur due to such a variation. Specifically, the processor 1 confirms whether the amount of a variation of the photographing distance by the camera 41 at the present pixel of interest, relative to the photographing distance at the immediately preceding pixel of interest, is within a preset tolerable range or not. Then, if the processor 1 determines "Yes" in Act 3d, the processor 1 goes to Act 3e.

In Act 3e, the processor 1 increments the value of the variable Count by 1, and updates the value of the variable Sum to a value which is calculated by adding the pixel value P(i) to the value of the variable Sum.

In Act 3f, the processor 1 confirms whether the value of the variable Count is a threshold Cc or more. The threshold Cc is properly preset by, for example, the designer of the display state determination apparatus 100 or the creator of the image processing program 21. For example, it is assumed that the number of pixels, which is calculated by subtracting a margin from the number of pixels corresponding to the length of the horizontal shelf member, is set as the threshold Cc. Specifically, the processor 1 confirms whether the number of consecutive pixels, with respect to which the difference in pixel value between neighboring pixels falls within the tolerable range, reached the number of pixels which is equivalent to the length of the horizontal shelf member. Then, if the processor 1 determines "No" in Act 3f, the processor 1 goes to Act 3h.

In the meantime, if the pixel value of the pixel of interest is a value corresponding to a distance which is not possible as the separation distance between the stereoscopic camera 4 and the display shelf, the processor 1 determines "No" in Act 3c. Besides, if the difference in pixel value between the present pixel of interest and the immediately preceding pixel of interest is outside the tolerable range, the processor 1 determines "No" in Act 3d. In these cases, the processor 1 goes to Act 3g.

In Act 3g, the processor 1 substitutes "1" for the variable Count, and substitutes the pixel value P(i) for the variable Sum. Specifically, the processor 1 counts the number of consecutive pixels once again from the beginning, and resets the cumulative sum of pixel values to the pixel value of the present pixel of interest. Thereafter, the processor 1 advances to Act 3h.

In Act 3h, the processor 1 confirms whether the variable i is less than a total pixel number N. The total pixel number N is the total number of pixels included in the distance image. Specifically, the processor 1 confirms whether the process of Act 3c to Act 3g was finished by setting all pixels included in the distance image as pixels of interest. If the processor 1 determines "Yes" in Act 3h, the processor 1 returns to Act 3b, and repeats the subsequent process in the same manner as described above. Thereby, the processor 1 repeats the process of Act 3c to Act 3g, while successively changing the pixel of interest.

The processor 1 continues to determine "Yes" in each of Act 3c and Act 3d, while successively setting, as the pixel of interest, the pixels located on the horizontal line on which the horizontal shelf member is photographed. Accordingly, in this state, the processor 1 gradually counts up the variable Count, and cumulatively adds the pixel value of each pixel to the variable Sum. Then, if the variable Count reaches the threshold Cc or more and the processor 1 determines "Yes" in Act 3f, the processor 1 goes to Act 3i.

In Act 3i, the processor 1 calculates the separation distance ds by dividing the value of the variable Sum by the value of the variable Count. Specifically, the processor 1 calculates the separation distance ds as an average value of the pixel values of a Cc-number of consecutive pixels. Thus, the processor 1 completes the process illustrated in FIG. 9. Incidentally, some other representative value, such as an upper value or a lower value of the pixel values of the Cc-number of consecutive pixels, may be set as the separation distance ds.

In the meantime, if the variable i reaches the total pixel number N or more while the variable Count does not reach the threshold Cc or more, and the processor 1 determines "No" in Act 3h, the processor 1 goes to Act 3j.

In Act 3j, the processor 1 sets the upper value Cu as the separation distance ds. Thus, the processor 1 completes the process illustrated in FIG. 9, that is, the process of Act 3 in FIG. 6. Thereafter, the processor 1 advances to Act 4 illustrated in FIG. 6.

In Act 4, the processor 1 confirms whether the adjustment flag 24 is ON or not. If the adjustment flag 24 is ON and the processor 1 determines "Yes" in Act 4, the processor 1 goes to Act 5.

In Act 5, the processor 1 calculates a search distance d1 as a value which is calculated by adding a value dm of the adjustment value 23 stored in the storage unit 2 to the separation distance ds. Incidentally, there is a case in which the value dm is a negative value. Thereafter, the processor 1 advances to Act 7. Thus, by the processor 1 executing the process based on the image processing program 21, the computer including the processor 1 as the central unit functions as the adjustment module 12c.

On the other hand, if the adjustment flag 24 is OFF and the processor 1 determines "No" in Act 4, the processor 1 goes to Act 6.

In Act 6, the processor 1 sets the separation distance ds as the search distance d1 as such. Thereafter, the processor 1 goes to Act 7.

In Act 7, the processor 1 generates an equidistance image. Specifically, the processor 1 generates the equidistance image as an image in which the pixel position of the pixel value with the value d1 in the distance image is set as the pixel value in the first shelf image relating to this pixel position, and the pixel values of the other pixel positions are set as a preset fixed value. Thus, by the processor 1 executing the process based on the image processing program 21, the computer including the processor 1 as the central unit functions as the generation module 14a.

Figure 10:
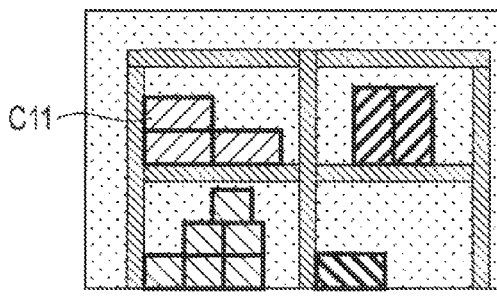
FIG. 10 is a view illustrating an example of an equidistance image.

FIG. 10 is a view illustrating an example of the equidistance image.

The equidistance image illustrated in FIG. 10 is an image which is generated based on the first shelf image shown in FIG. 7 and the distance image shown in FIG. 8, when the separation distance ds is set as the search distance d1 as such.

In the example illustrated in FIG. 7, the photographing distance by the camera 41 of products C1, C2 and C3 is greater than the separation distance ds. Each of the photographing distances by the camera 41 of the products other than the products C1, C2 and C3, which appear on the first shelf image shown in FIG. 7, is ds. Thus, the products C1, C2 and C3 do not appear on the equidistance image shown in FIG. 10.

Each of the products other than the products C1, C2 and C3 are arranged on the front side of the display shelf, and the photographing distance by the camera 41 is substantially equal to ds. Strictly speaking, in many cases, the photographing distance of these products is slightly greater than the separation distance ds. However, by properly adjusting the resolution relating to the estimation of the photographing distance of each pixel, the equidistance image as illustrated in FIG. 10 can be generated. Alternatively, at the time of generating the equidistance image, photographing distances within a preset range are regarded as the identical photographing distance, and thereby the equidistance image as illustrated in FIG. 10 can be generated.

Figure 11:
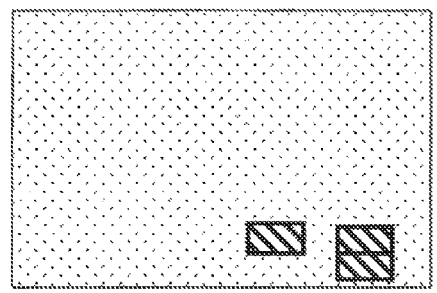
FIG. 11 is a view illustrating another example of the equidistance image.

FIG. 11 is a view illustrating another example of the equidistance image.

The equidistance image illustrated in FIG. 11 is an image which is generated based on the first shelf image shown in FIG. 7 and the distance image shown in FIG. 8, when a value, which is calculated by adding a value dm to the separation distance ds is set as the search distance d1. The value dm is equal to a difference between the photographing distance by the camera 41 of the products C1, C2 and C3 and the separation distance ds. Thus, only the products C1, C2 and C3 appear on the equidistance image shown in FIG. 11.

In Act 8, the processor 1 selects, from among the single item images included in the single item image database 22, one single item image which is yet to be selected during the current execution of the process illustrated in FIG. 6. The product, which this selected single item image represents, becomes a product of a detection target.

In Act 9, the processor 1 generates a template image by converting the number of pixels of the selected single item image. Specifically, when the photographing distance of the selected single item image is expressed as d2, the processor 1 sets the magnification to be d2/d1. The processor 1 converts the number of pixels of the single item image so that the number of pixels of the single item image becomes, both in the horizontal and vertical directions, a number of pixels which is calculated by multiplying the number of pixels of the single item image by the magnification that was set as described above. A well-known process is applicable as a concrete process of this pixel number conversion. Then, the processor 1 sets the image, which was obtained by this pixel number conversion, as the template image. Thus, by the processor 1 executing the process based on the image processing program 21, the computer including the processor 1 as the central unit functions as the generation unit 13.

Figure 12:
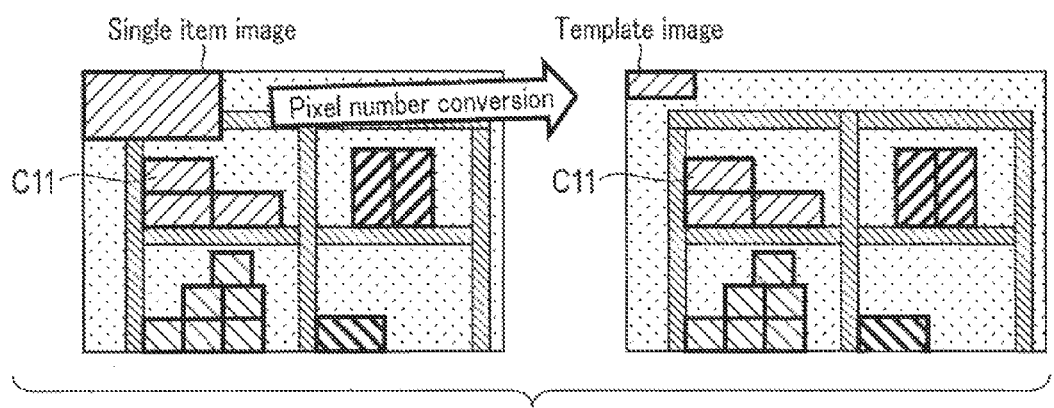
FIG. 12 is a view illustrating a state of generation of a template image.

FIG. 12 is a view illustrating a state of generation of the template image.

Since a single item image is captured by photographing a product as a single piece, it is assumed that the photographing distance of the single item image is smaller than the photographing distance of the shelf image. Thus, in many cases, the single item image is larger than the image of a product of the same kind which is photographed in the equidistance image. Consequently, if a single item image relating to a product C11 is overlapped as such on the equidistance image shown in FIG. 10, the single item image appears, for example, in a state as illustrated on the left-side part of FIG. 12. However, if a template image, which was obtained by executing the above-described pixel number conversion on the single item image in this state, is overlapped on the equidistance image shown in FIG. 10, the single item image appears in a state as illustrated on the right-side part of FIG. 12. The size of the temperate image is substantially equal to the size of the image of the product C11.

In Act 10, the processor 1 executes template matching by using the equidistance image and the template image. Thus, by the processor 1 executing the process based on the image processing program 21, the computer including the processor 1 as the central unit functions as the matching module 14b.

Figure 13:
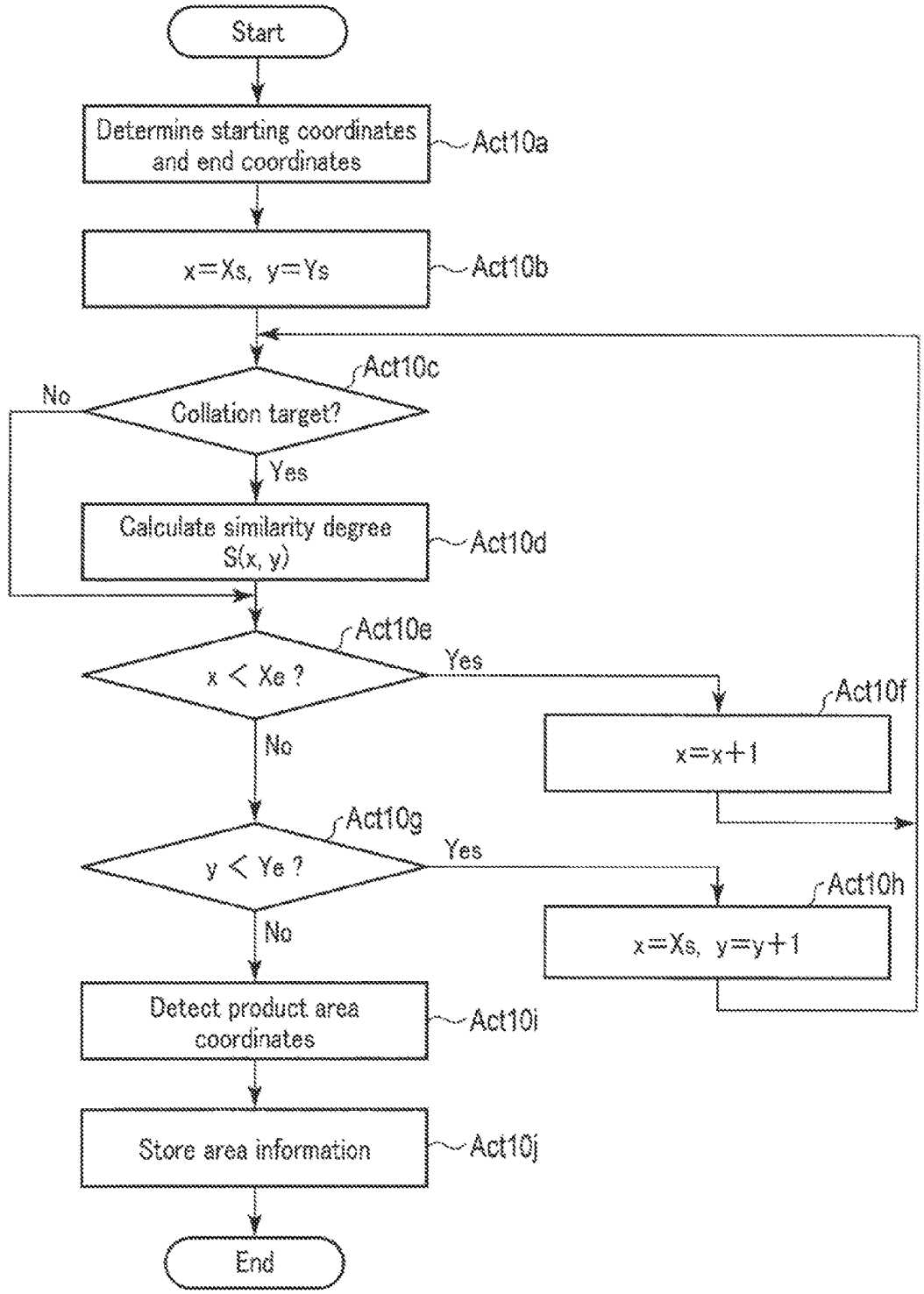
FIG. 13 is a flowchart illustrating a detailed process of the processor in FIG. 1 in template matching in FIG. 6.

FIG. 13 is a flowchart illustrating a detailed process of the processor 1 in Act 10.

In Act 10a, the processor 1 determines starting coordinates (Xs, Ys) and end coordinates (Xe, Ye). For example, the processor 1 sets the coordinates of the upper left corner of the equidistance image as the starting coordinates (Xs, Ys). In addition, the processor 1 sets, as the end coordinates (Xe, Ye), for example, coordinates which are determined by reducing the horizontal-directional number of pixels of the template image in the horizontal direction from the coordinates of the lower right corner of the equidistance image and by reducing the vertical-directional number of pixels of the template image in the vertical direction from the coordinates of the lower right corner of the equidistance image.

FIG. 14 is a view illustrating the starting coordinates (Xs, Ys) and end coordinates (Xe, Ye) which are determined by the above-described example.

In the meantime, when the processor 1 can specify, based on the planogram information 25, the display range of a product relating to the selected single item image in the equidistance image, the processor 1 may determine the starting coordinates (Xs, Ys) and end coordinates (Xe, Ye) in the same manner as described above, with reference to the upper left corner and lower right corner of the region of the display range. The processor 1 may execute switching as to whether or not to refer to the planogram information 25, in accordance with a mode setup which was preset according to the user's instruction.

In Act 10b, the processor 1 substitutes Xs for a variable x, and substitutes Ys for a variable y. The variable x and variable y represent, respectively, the horizontal and vertical positions of the coordinates at which the upper left corner of the template image is positioned on the equidistance image. In other words, the coordinates, where the upper left corner of the template image is positioned on the equidistance image, are expressed by (x, y). Then, the processor 1 sets the initial values of the coordinates to (Xs, Ys), that is, the starting coordinates.

In Act 10c, the processor 1 confirms whether an area (hereinafter referred to as "target area") of the equidistance image, which overlaps the template image in the state in which the upper left corner of the template image is positioned at the coordinates (x, y), is a matching target or not. Here, when the target area includes many pixels with pixel values which are fixed values, a similarity degree between the image in the target area and the template image is low. Thus, when a preset condition is satisfied with respect to the number of pixels included in the target area, whose pixel values are fixed values, the processor 1 does not set the target area as the matching target. Specifically, it is thinkable that, when the ratio of pixels with pixel values, which are fixed values, to the pixels included in the target area is a preset threshold or more, the processor 1 does not set the target area as the matching target. Then, if the target area is the matching target and the processor 1 determines "Yes" in Act 10c, the processor 1 goes to Act 10d.

In Act 10d, the processor 1 calculates a similarity degree S(x, y) between the image in the target area and the template image. The processor 1 stores the similarity degree S(x, y) in the storage unit 2. A method, which is known in well-known template matching techniques, can be used for the calculation of the similarity degree S(x, y). Subsequently, the processor 1 advances to Act 10e.

In the meantime, if the target area is not the matching target and the processor 1 determines "No" in Act 10c, the processor 1 passes over Act 10d and goes to Act 10e.

In Act 10e, the processor 1 confirms whether the value of variable x is less than Xe or not. If the value of variable x is less than Xe and the processor 1 determines "Yes" in Act 10e, the processor 1 goes to Act 10f.

In Act 10f, the processor 1 increments the value of variable x by 1. Thereafter, the processor 1 returns to Act 10c, and repeats the subsequent process in the same manner as described above. Specifically, the processor 1 repeatedly calculates the similarity S(x, y) while changing the position of the template image on a pixel-by-pixel basis in the horizontal direction, as indicated by an arrow in FIG. 14. If the processor 1 repeats this process until the variable x reaches Xe, the processor 1 determines "No" in Act 10e since the value of variable x is Xe or more. In this case, the processor 1 advances to Act 10g.

In Act 10g, the processor 1 confirms whether the value of variable y is less than Ye or not. If the value of variable y is less than Ye and the processor 1 determines "Yes" in Act 10g, the processor 1 goes to Act 10h.

In Act 10h, the processor 1 substitutes Xs for the variable x and increments the value of variable y by 1. Thereafter, the processor 1 returns to Act 10c, and repeats the subsequent process in the same manner as described above.

In this manner, by repeating Act 10c to Act 10h, the processor 1 collects similarity degrees S(x, y) relating to the respective areas that are matching targets, while gradually changing the position of the template image.

When the upper left corner of the template image is positioned at the end coordinates (Xe, Ye), the variable y is Ye or more. Thus, the processor 1 determines "No" in Act 10g. In this case, the processor 1 advances to Act 10i.

In Act 10i, the processor 1 detects all product area coordinates. Product area coordinates are the coordinates of the upper left corner of the area in the equidistance image, where the same product as the product represented by the template image appears. Specifically, although varying depending on an adopted method of calculating the similarity degree, the similarity degree, for example, becomes maximum when the template image completely coincides with the image of the target area. In addition, as the difference between both images increases, the similarity degree lowers. When the similarity degree S(x, y) exhibits this property, the similarity degrees S(x, y), which were collected by repeating Act 10c to Act 10h, have such values that a value relating to certain coordinates becomes greater than a value relating to nearby coordinates thereof. Thus, the processor 1 selects similarity degrees S(x, y) with upper values from among the collected similarity degrees S(x, y). Further, the processor 1 selects, from the selected similarity degrees S(x, y), a similarity degree S(x, y) with a predetermined threshold or more, and sets coordinates (x, y), where this selected similarity degree S(x, y) was obtained, as the product area coordinates.

In Act 10j, the processor 1 generates area information including all detected product area coordinates and identification information of the product represented by the selected single item image, and stores the area information in the storage unit 2. Incidentally, as the identification information of the product, for example, a product code is used. In the example illustrated in FIG. 14, the processor 1 detects three coordinates (x1, y1), (x1, y2) and (x2, y1) as the product area coordinates. Then, the processor 1 stores in the storage unit 2 the area information including these coordinates and the identification information of the product C11. Thus, the processor 1 completes the process illustrated in FIG. 13, that is, the process of Act 10 in FIG. 6. Subsequently, the processor advances to Act 11 shown in FIG. 6. Incidentally, the processor 1 may include other information, such as the size of the template image, in the area information.

In Act 11, the processor 1 confirms whether there is a non-selected single item image, which is yet to be selected during the current execution of the process illustrate in FIG. 6, among the single item images included in the single item image database 22. If there is a non-selected single item image and the processor 1 determines "Yes" in Act 11, the processor 1 returns to Act 8 and repeats the subsequent process in the same manner as described above. Thus, the processor 1 successively executes template matching by using template images generated from the respective single item images included in the single item image database 22. If the processor 1 completes the selection of all single item images and determines "No" in Act 11, the processor 1 ends the image process illustrated in FIG. 6.

As described above, according to the display state determination apparatus 100, the template image becomes the image which is represented by substantially the same number of pixels as the product which was photographed by the camera 41 in the state in which the search distance is set as the photographing distance and is included in the first shelf image. Thus, when the product appearing in the single item image, which was used in order to generate the template image, is captured in the first shelf image in the state in which the search distance is set as the photographing distance, the display state determination apparatus 100 can determine that the area of the product is an area similar to the template image. Furthermore, the template image is an image which represents, with substantially the same number of pixels, the product of the detection target which is captured in the shelf image in the state in which the search distance is set as the photographing distance. Thus, the similarity degree between the template image and the image of the product of the detection target is very high, and the display state determination apparatus 100 can exactly distinguish the area in which the product of the detection target appears, from the other area.

Additionally, the display state determination apparatus 100 estimates the separation distance ds from at least two shelf images which were captured in different directions. Therefore, there is no need to provide a sensor or the like for measuring the separation distance ds.

Additionally, the display state determination apparatus 100 determines that part of the shelf image, which corresponds to the horizontal shelf member, based on the distance estimated with respect to each of the pixels of the shelf image, and calculates the separation distance ds as the representative value of the distances of the pixels included in this part. Therefore, there is no need to equip the display shelf or products with a device for estimating the distance.

Additionally, the display state determination apparatus 100 determines the search distance d1 by adjusting the separation distance ds by the adjustment value 23. Thus, even when the separation distance ds is calculated as described above, the search distance d1 can be set to be a distance that is different from the separation distance ds.

Additionally, the display state determination apparatus 100 sets the adjustment value 23 to be a value corresponding to a user operation. It is thus possible to set the search distance d1 to be a distance desired by the user.

Additionally, according to the display state determination apparatus 100, when the area of the equidistance image, which overlaps the template image, includes many pixels with fixed values, this area is not set as the matching target. Therefore, the processing amount of the processor 1 for image matching decreases, and the load on the processor 1 can be reduced.

In the present embodiment, the following various modifications can be implemented.

It is possible to estimate the separation distance ds, based on three or more shelf images which were captured by three or more cameras.

It is possible to provide two or more cameras, in addition to the first camera. The separation distance ds may be estimated based on two or more shelf images which were captured by the cameras other than the first camera.

It is possible to estimate the separation distance ds by using a measuring device such as a laser range finger.

It is possible to form a predetermined mark on the display shelf in the state in which the mark can be photographed by the camera 41, 42, and to estimate the separation distance ds as the distance to the mark. As this mark, for example, the above-described bar code for identifying the display shelf is usable.

It is possible to execute the template matching by setting the first shelf image as a target, without generating the equidistance image. In addition, even when the equidistance image is set as the target of template matching, the determination in Act 10c may be omitted, and the similarity degrees may be calculated with respect to all positions from the starting coordinates to the end coordinates.

In the meantime, the distance image may not be generated when the separation distance ds is estimated by using a measuring device, or when the separation distance ds is estimated based on the position of the mark formed on the display shelf and the equidistance image is not generated.

While certain embodiments have been described, these embodiments have been presented by way of example only, and are not intended to limit the scope on the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus which is accessible to at least one storage device storing a first shelf image acquired by photographing, with a first camera, a display shelf for displaying a product, a second shelf image acquired by photographing the display shelf with a second camera from a direction that is different from that of the first camera, and an single item image acquired by photographing the product as a single piece with a known photographing distance, the apparatus comprising a processor configured to:

receive the first shelf image, the second shelf image, and the single item image, estimate a separation distance from the first camera to the display shelf, based on the first shelf image and the second shelf image, determine a search distance, based on the estimated separation distance, generate a template image by converting a number of pixels of the single item image stored in the storage device, with a magnification corresponding to a ratio between the determined search distance and the known photographing distance, identify the product and an area of the product within a target area of the first shelf image based on similarity degrees between pixels of the first shelf image and the pixels of the template image.

2. The image processing apparatus according to claim 1, wherein the processor is further configured to:

estimate, with respect to each of pixels constituting the first shelf image, a distance from the first camera to an object which the pixel represents, and set, when each of differences between distances of neighboring pixels of a plurality of pixels which are consecutive in a horizontal direction over a prescribed number of pixels or more is less than a tolerable difference value, a representative value of the distances of the plurality of pixels to be the separation distance.

3. The image processing apparatus according to claim 2, wherein the processor is further configured to:

generate an equidistance image which indicates a pixel value in the first shelf image, with respect to a pixel of the shelf image, which has a distance that is equal to the search distance, and indicates a preset pixel value with respect to other pixels of the shelf image, and set an area in the equidistance image, which is similar to the template image as the target area.

4. The image processing apparatus according to claim 1, wherein the processor determines the separation distance that is estimated based on the first shelf image and the second shelf image as the search distance.

5. The image processing apparatus according to claim 1, wherein the processor is further configured to:

set an adjustment value in accordance with an instruction by a user, wherein the processor estimates the separation distance from the first camera to the display shelf, and determines the search distance by adjusting the separation distance by the set adjustment value.

6. A display state determination apparatus comprising:

a first camera;

a second camera;

at least one storage device storing a first shelf image acquired by photographing, with the first camera, a display shelf for displaying a product, a second shelf image acquired by photographing the display shelf with a second camera from a direction that is different from that of the first camera, and an single item image acquired by photographing the product as a single piece with a known photographing distance; and a processor configured to:

estimate a separation distance from the first camera to the display shelf, based on the first shelf image and the second shelf image, determine a search distance, based on the estimated separation distance, generate a template image by converting a number of pixels of the single item image stored in the storage device, with a magnification corresponding to a ratio between the determined search distance and the known photographing distance, and identify the product and an area of the product within a target area of the first shelf image based on similarity degrees between pixels of the first shelf image and the pixels of the template image.

7. An image processing method by a computer included in an image processing apparatus which is accessible to at least one storage device storing a first shelf image acquired by photographing, with a first camera, a second shelf image acquired by photographing the display shelf with a second camera from a direction that is different from that of the first camera, a display shelf for displaying a product, and an single item image acquired by photographing the product as a single piece with a known photographing distance, the method comprising:

estimating a separation distance from the first camera to the display shelf, based on the first shelf image and the second shelf image, and determining a search distance, based on the estimated separation distance;

generating a template image by converting a number of pixels of the single item image stored in the storage device, with a magnification corresponding to a ratio between the determined search distance determined by the decision unit and the known photographing distance; and identifying the product and an area of the product within the first shelf image based on similarity degrees between pixels of the first shelf image and the pixels of the template image.

* * * * *